US007043730B2

(12) United States Patent
Tanaka

(10) Patent No.: US 7,043,730 B2
(45) Date of Patent: May 9, 2006

(54) SYSTEM AND METHOD FOR DEMAND ORIENTED NETWORK RESOURCE MANAGEMENT

(75) Inventor: Motoo Tanaka, Pleasanton, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 652 days.

(21) Appl. No.: 10/232,783

(22) Filed: Aug. 29, 2002

(65) Prior Publication Data

US 2004/0044769 A1    Mar. 4, 2004

(51) Int. Cl.
*G06F 9/46*    (2006.01)
(52) U.S. Cl. ............... 718/104; 709/226; 709/223; 709/228
(58) Field of Classification Search ............... 718/100, 718/102, 103, 104; 709/203, 223, 226, 228
See application file for complete search history.

(56) References Cited

U.S. PATENT DOCUMENTS

| | | | | |
|---|---|---|---|---|
| 5,363,374 A | * | 11/1994 | Zein Al Abedeen et al. | 370/233 |
| 5,442,791 A | * | 8/1995 | Wrabetz et al. | 719/330 |
| 5,640,595 A | * | 6/1997 | Baugher et al. | 710/10 |
| 6,058,113 A | * | 5/2000 | Chang | 370/390 |
| 6,178,445 B1 | * | 1/2001 | Dawkins et al. | 709/209 |
| 6,578,068 B1 | * | 6/2003 | Bowman-Amuah | 709/203 |
| 6,678,281 B1 | * | 1/2004 | Chakrabarti et al. | 370/438 |
| 6,742,015 B1 | * | 5/2004 | Bowman-Amuah | 718/101 |
| 6,760,306 B1 | * | 7/2004 | Pan et al. | 370/230 |
| 6,775,701 B1 | * | 8/2004 | Pan et al. | 709/226 |

* cited by examiner

*Primary Examiner*—Majid A. Banankhah

(57) ABSTRACT

A system and method is disclosed for network resource management. The method discloses: receiving a request to execute a task; calculating a virtual set of resources required to execute the task; reserving a set of network services for each virtual resource; and executing the task on the reserved services The system discloses means of implementing the method.

19 Claims, 3 Drawing Sheets

SYSTEM AND METHOD FOR DEMAND ORIENTED NETWORK RESOURCE MANAGEMENT

BACKGROUND OF THE INVENTION

1. Field of the Invention

The present invention relates generally to systems and methods for network resource management, and more particularly to systems and methods for demand oriented network resource management.

2. Discussion of Background Art

Traditional network computer models process tasks either on individual client computers or on network servers. Tasks, regardless of whether they are computationally simple or complex, may from time to time overwhelm client and/or server resources. For instance, computationally complex tasks may not be executable on a single client computer in a timely manner, and such tasks may not even be executable by reasonably powerful central network servers which are over-scheduled with tasks submitted by many different client computers.

One way to handle such complex computations is by upgrading either the client or server computers. Such an option, while often the only choice, is very expensive and typically involves a substantial latency period as all of the required hardware and software are ordered, configured and implemented.

New server purchases are also burdened by increased costs from adding dedicated administrators, greater maintenance, and the highly complex and costly operating systems required to implement such increasingly powerful servers. New client computer purchases, similarly result in higher incremental costs, from purchasing such new client computers, and tend to waste processing power, since powerful clients mostly sit idle, except for the occasional times when their substantial processing power would be required.

In response to the concerns discussed above, what is needed is a system and method for network resource management that overcomes the problems of the prior art.

SUMMARY OF THE INVENTION

The present invention is a system and method for network resource management. The method of the present invention includes: receiving a request to execute a task; calculating a virtual set of resources required to execute the task; reserving a set of network services for each virtual resource; and executing the task on the reserved services. Alternate embodiments of the method may also include one or more of the following elements: calculating a virtual program, processor, memory, and I/O resources required to execute the task; reserving a set of program, processor, memory, and I/O services for effecting the virtual program resource; creating a resource liaison for effecting a virtual resource; using the liaison to reserve a set of services provided by devices connected to a network in order to support the virtual resource; receiving a set of network service responses indicating whether a network service is available to support execution of the task; reserving a network service if the network service's response indicates that the network service is available; receiving a network service response indicating that a network service is no longer available to support execution of the task; and halting execution of the task in response to the network service's unavailability.

The system of the present invention includes all means of implementing the method.

These and other aspects of the invention will be recognized by those skilled in the art upon review of the detailed description, drawings, and claims set forth below.

DETAILED DESCRIPTION OF THE PREFERRED EMBODIMENT

The present invention configures and manages a set of networked computers based on a computational demand oriented model. In such a model, the networked computers pool their resources, effectively operating as one super-server. By pooling network resources, the system and method of the present invention are a less expensive alternative to adding new client or server hardware. Such network level resource collaboration and distributed task processing, also permits systems administrators to forgo dedicated servers, while still providing adequate processing and other resources on demand.

Figure 1:
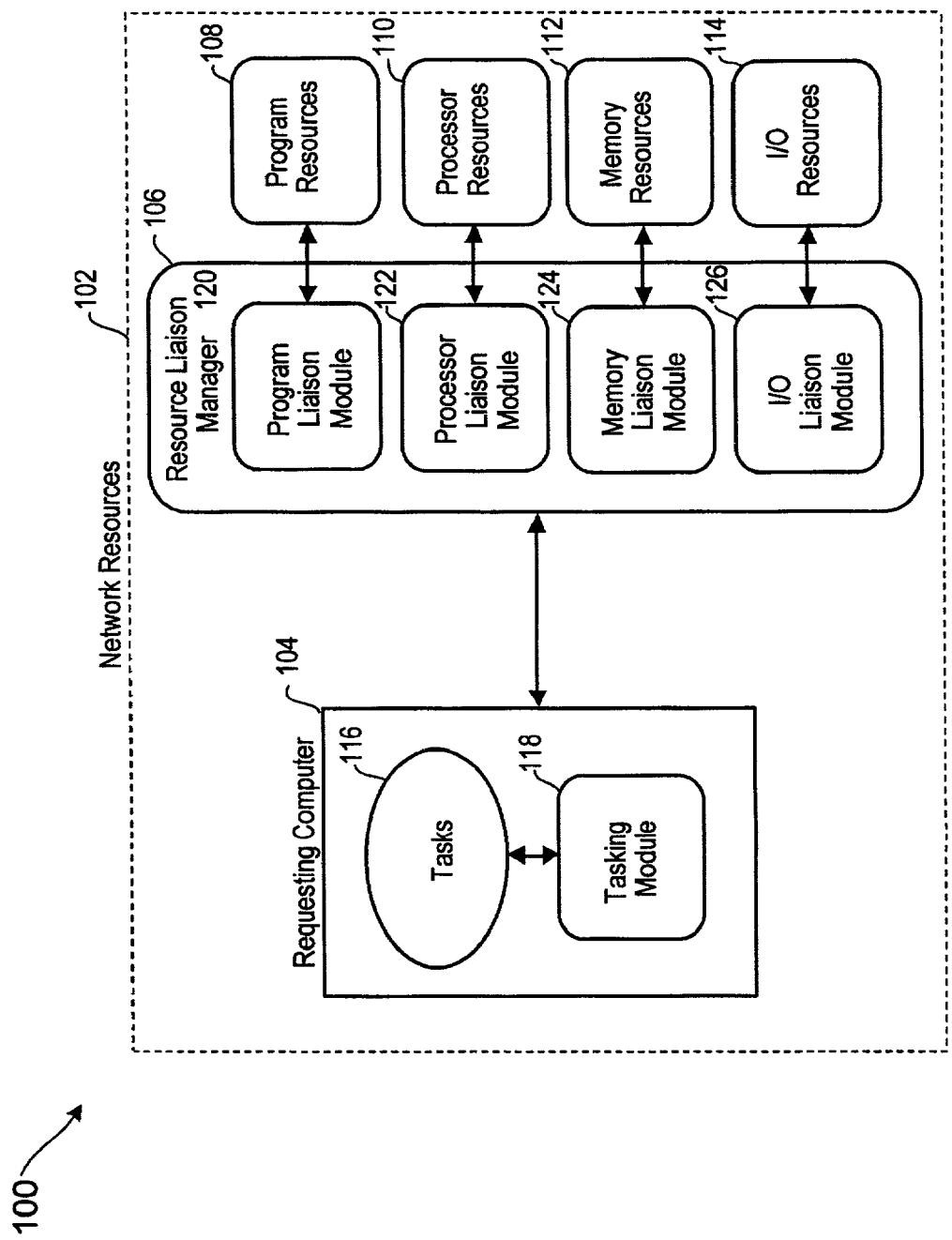
FIG. 1 is a dataflow diagram of one embodiment of a system for demand oriented network resource management.

FIG. 1 is a dataflow diagram of one embodiment of a system 100 for demand oriented network resource management. The system 100 includes a set of network resources 102. These resources 102 include a requesting computer 104 and a resource liaison manager 106, as well as other resources. These other resources may include program resources 108, processor resources 110, memory resources 112, and I/O resources 114. One or more of these resources may be effected by any number of hardware devices, such as personal computers, servers, databases, printers, etc. Those skilled in the art recognize that the resource categories describe above can be organized, grouped and/or labeled in many different ways which have no impact on how the present invention operates. The network resources 102 are interconnected using a network interface (shown by the solid lines connecting the various network resources). The network interface preferably operates according to standard network protocols.

The requesting computer 104 requests services from the set of network resources 102, and the network resources 102 are configured by the present invention to provide those requested services. The requesting computer 104 is also one of the network resources 102, but is shown separately for the sake of clarity in the present invention's discussion.

The requesting computer 104 includes a set of tasks 116 and a tasking module 118. The tasks 116 are contemplated to include any function, process, application, etc. to be effected by the requesting computer 104, including data processing, data transfer, utility, and similar tasks. The tasking module 118, as will be discussed further below, includes a compiler which analyzes each task and in turn generates a set of application program, processor, memory, I/O, and perhaps many other service requests for effecting said task.

The resource liaison manager 106 receives the resource requests from the tasking module 118 over the network interface and in turn generates one or more liaison modules, each responsible for a predetermined portion of the task's execution. For example, if the tasking module 118 had sent a set of application program, processor, memory, and I/O resource requests to the liaison manager 106, the liaison manager 106 would then in turn generate, a program liaison module 120, a processor liaison module 122, a memory liaison module 124, and an I/O liaison module 126. These liaison modules would then identify which of the other resources within the set of network resources 102 can provide one or more services for effecting said tasking module's 118 resource requests.

Since the liaison manager 106 can preferably receive and process multiple resource requests from many other requesting computers connected to the network, the liaison manager 106 is preferably located on a server which is always available on the network to all possible requesting computers. In alternate embodiments however, the liaison manager 106 can be located on several different computers or within each requesting computer 104 itself.

Note that the terms "services" and "tasks," while basically synonyms, are used within the present discussion to enable a clearer distinction to be made between "resource requests" from the requesting computer 104 and "resources provided" by the set of network resources 102. Thus, for the purposes of this discussion, the requesting computer 104 has a "task" to be completed, and the network resources 102 provide "services" in order to fulfill that task. Note one or more of the network resources may themselves request network resources in order to provide said services. In such a case the network resource itself becomes a requesting computer and thus may also benefit from the teaching of the present invention. Any set of services and liaisons can reside in any of the network resources 102.

Figure 2:
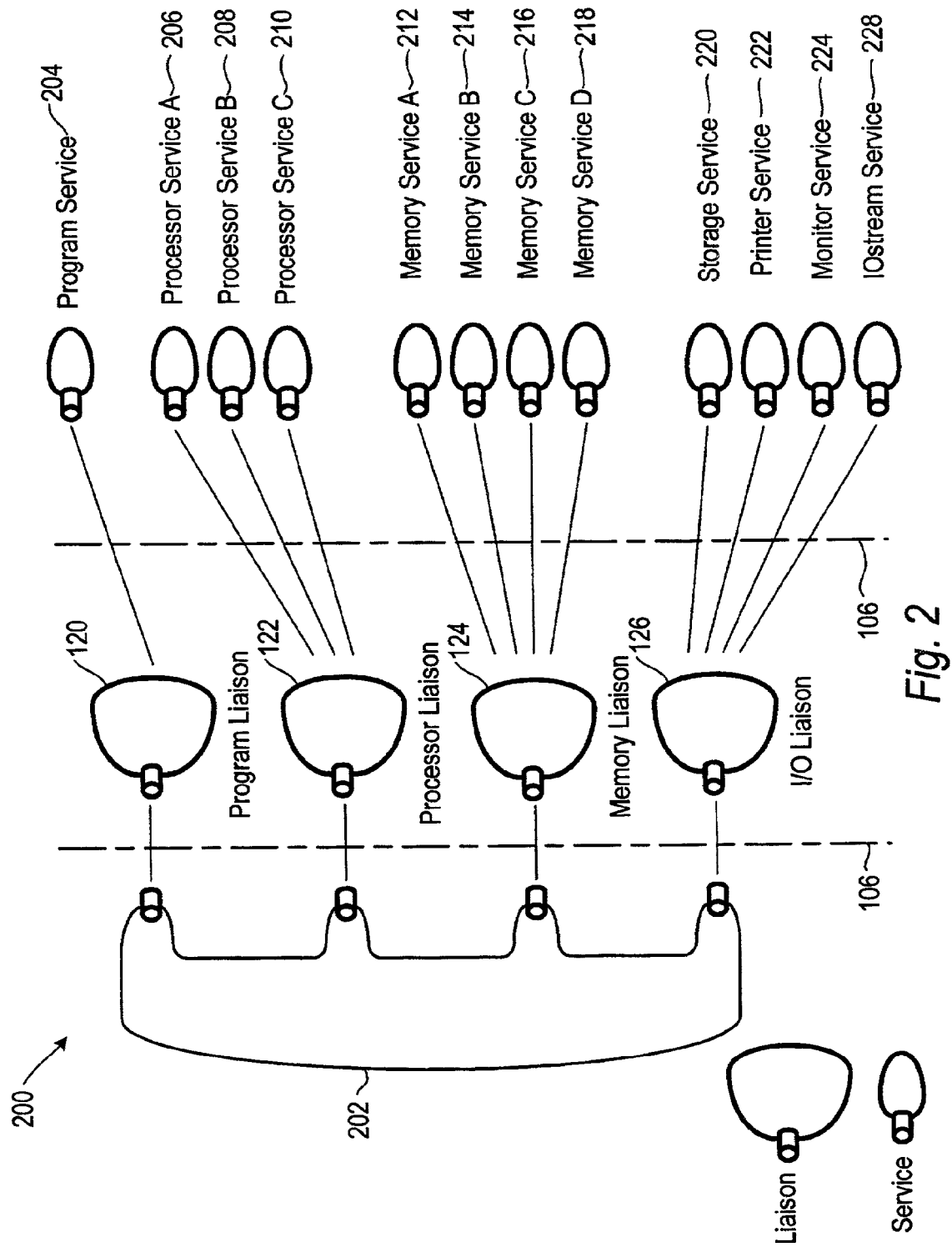
FIG. 2 is a dataflow diagram of one embodiment of how services are allocated to tasks.
Figure 3:
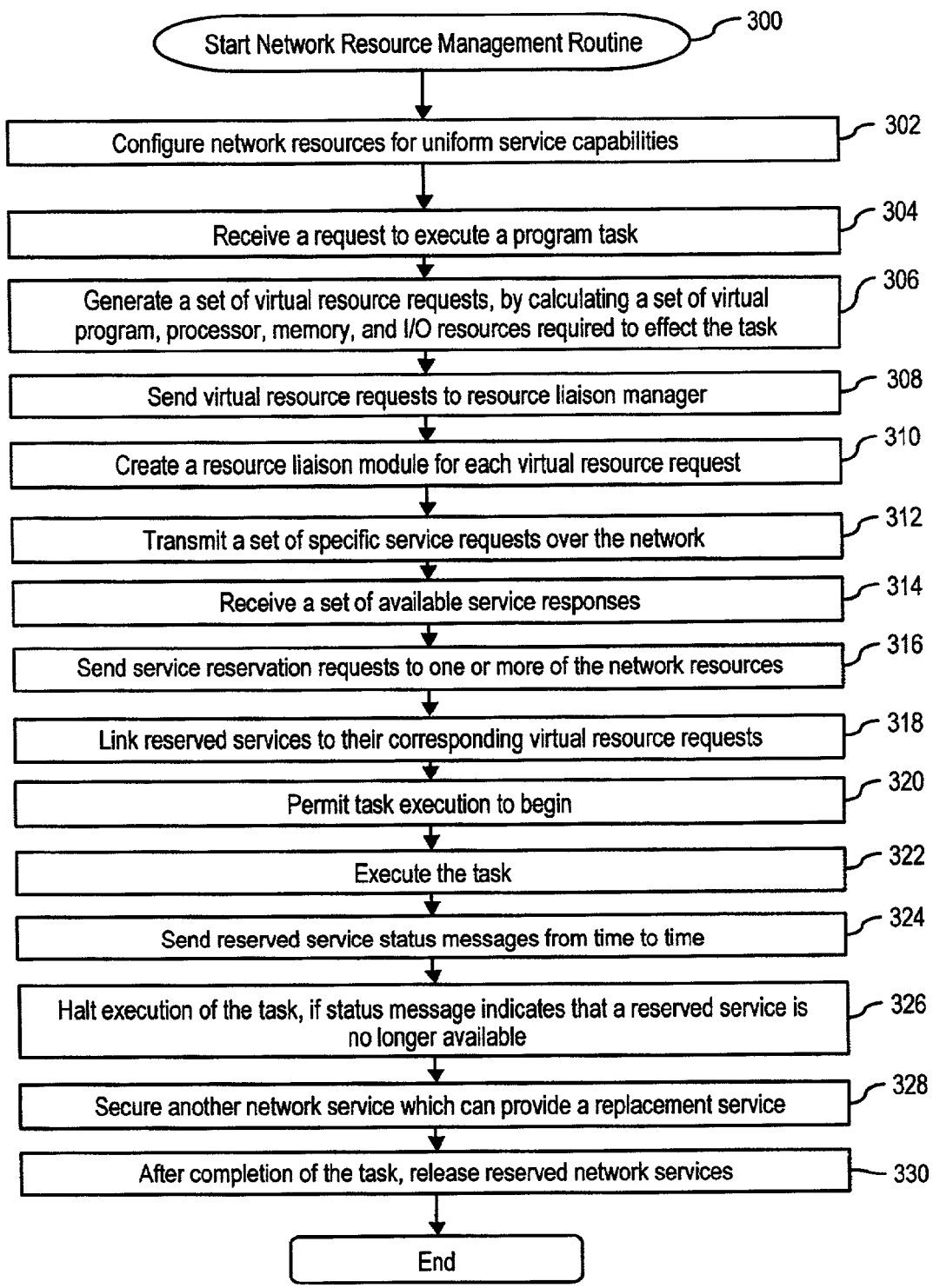
FIG. 3 is a flowchart of one embodiment of a method for demand oriented network resource management.

FIG. 2 is a dataflow diagram 200 of one embodiment of how services with one or more network resources 102 are allocated to tasks within the system 100. FIG. 3 is a flowchart of one embodiment of a method 300 for demand oriented network resource management. FIGS. 2 and 3 are now discussed together.

The method 300 begins in step 302, where a systems administrator configures the set of network resources 102 for uniform service capabilities. Configuring these resources for uniform service capabilities is herein defined as configuring a predetermined number of network resources so that other network resources can selectively access and benefit from each other's application programs, processing power, memory resources, I/O resources, and the like.

Next in step 304, the tasking module 18 receives a request to execute a program task 202 from the set of tasks 116. In step 306, the tasking module 118 generates a set of virtual resource requests by calculating a total set of virtual program resources, virtual processing resources, virtual memory resources, and virtual I/O resources which would be required to effect the task (e.g. this much processor word-size and speed, this much memory size, storage and I/O requirements, etc.). Methods for performing this calculation are well known in the art, such as those implemented within a compiler when generating execution code.

In step 308, the tasking module 118 sends the virtual resource requests to the liaison manager 106. In step 310, the liaison manager 106 creates a resource liaison module corresponding to each of the tasking module's 118 virtual resource requests. In the embodiment shown, the liaison manager 106 creates the program liaison module 120 for hosting the virtual program resource request, the processor liaison module 122 for hosting the virtual processor resource request, the memory liaison module 124 for hosting the virtual memory resource request, and the I/O liaison module 126 for hosting the virtual I/O resource request. Those skilled in the art will recognize that additional liaison modules can be created, depending upon the task to be executed.

Next in step 312, each resource liaison module 120, 122, 124 and 126 created in response to the virtual resource requests, transmits a set of liaison specific service requests over the network. In step 314, each resource liaison 120, 122, 124 and 126 receives a set of available service responses over the network. The available service responses are generated by one or more of the network resources 102, and indicate how many of the requested service each network resource can provide. In some instances, one powerful network resource offers to provide all of the requested services. While in another instance, several network resources may be required to effect only one of the service requests.

In step 316, the resource liaisons send a service reservation request to one or more of the network resources 102, which can either singly or together, provide those services necessary to effect that resource liaison's hosted virtual resource request required by the tasking module 118.

In the embodiment shown in FIG. 2, the following reservations have occurred: Program liaison module 120 has reserved program service 204, from the network resources 102, in order to effect the tasking module's 118 virtual program resource request. Processor liaison module 122 has reserved processor services A 206, B 208, and C 210 on three different network resources, A, B, and C, in order to effect the tasking module's 118 virtual processor resource request. Memory liaison module 124 has reserved memory services A 212, B 214, C 216, and D 218 on four different from network resources, A, B, C, and D, in order to effect the tasking module's 118 virtual memory resource request. And finally I/O liaison module 126 has reserved storage service 220, printer service 222, monitor service 224, and I/O stream service 226 from the network resources 102, in order to effect the tasking module's 118 virtual I/O resource request.

Once the necessary network resources have been reserved, the liaison manager 106, in step 318, links the reserved services to their corresponding virtual resource requests, using either pointers or handles, specifying the necessary paths. In step 320, the liaison manger 106 sends a message to the tasking module 118 indicating that task execution may begin. Then in step 322 the tasking module 118 executes the task 202 until completion.

Note, each of the liaison's 120, 122, 124 and 126 appears to the tasking module 118 to be only a single virtual resource, even though the liaison's have often times aggregated several real resource services in order to effect each virtual resource. For example, if the task 202 requires 4 GB of virtual memory, but each individual memory service can only provide 1 GB of memory, the memory liaison module 124 reserves the 4 GB of memory using four different memory services; however, from the task's 202 reference point, the memory liaison module 126 has provided the entire 4 GB of memory.

In step 324, each of the reserved network services, from time to time, send a status message to the liaison manager 106. The status message indicates whether that particular network service is still available or not. In step 326, if the liaison manager 106 receives a status message from one of the network services indicating that that service is no longer available, the liaison manager 106 instructs the tasking module 118 to halt execution of the task 202.

Then, in step 328, the particular resource liaison module 120, 122, 124 or 126 affected by the network service unavailability, repeats steps 312 through 318 in order to secure another network service which can provide a replacement service, after which steps 320 through 320 are repeated.

In step 330, after completion of the task 202, the resource liaisons modules 120, 122, 124 and 126 send messages releasing the reserved network services, after which the method 300 ends.

The capacity of the network resources 102 to provide services to requesting computers can easily be increased by adding additional network resources, providing additional service capability, to the set of network resources 102. Thus by adding more resources, such as personal computers or servers, to the network, more CPU power, memory capacity and the like, become available, instantly benefiting all of the network's users. In fact, using the present invention, tasks can be executed which would have required more services than any one server computer could have individually provided. In this way the present invention functions as a sort of "super-server."

Also, while any single hardware device, such as a server or a personal computer, is limited by its design, the present invention's distributed approach benefits from a relatively unlimited number of network resources which can be brought to bear to effect a task. This flexibility is a substantial advantage over fixed hardware oriented systems.

While one or more embodiments of the present invention have been described, those skilled in the art will recognize that various modifications may be made. Variations upon and modifications to these embodiments are provided by the present invention, which is limited only by the following claims.

What is claimed is:

1. A computer implemented method for network resource management, comprising:
   receiving a request to execute a task, wherein the request is received by a tasking module;
   calculating a set of virtual resources required to execute the task;
   generating virtual resource requests from the calculated set of virtual resources;
   generating a liaison module for each virtual resource request, wherein each liaison module identifies the network resources needed to provide services for a portion of the task's execution;
   reserving a set of network services for each virtual resource; and
   executing the task using the reserved services.

2. The method of claim 1 wherein:
   the calculating element includes, calculating a virtual program resource required to execute the task; and
   the reserving element includes, reserving a set of program services for effecting the virtual program resource.

3. The method of claim 1 wherein:
   the calculating element includes, calculating a virtual processor resource required to execute the task; and
   the reserving element includes, reserving a set of processor services for effecting the virtual processor resource.

4. The method of claim 1 wherein:
   the calculating element includes, calculating a virtual memory resource required to execute the task; and
   the reserving element includes, reserving a set of memory services for effecting the virtual memory resource.

5. The method of claim 1 wherein:
   the calculating element includes, calculating a virtual 110 resource required to execute the task; and
   the reserving element includes, reserving a set of 110 services for effecting the virtual I/O resource.

6. The method of claim 1 wherein the reserving element includes:
   reserving services on more than one network device in order to effect one of the virtual resources.

7. The method of claim 1 wherein the reserving element includes:
   using the liaison modules to reserve a set of services provided by devices connected to a network in order to support the virtual resource.

8. The method of claim 7 wherein the using element includes:
   using a program liaison module to reserve a set of program services.

9. The method of claim 7 wherein the using element includes:
   using a processor liaison module to reserve a set of processor services.

10. The method of claim 7 wherein the using element includes:
    using a memory liaison module to reserve a set of memory services.

11. The method of claim 7 wherein the using element includes:
    using an I/O liaison module to reserve a set I/O services.

12. The method of claim 1 wherein the reserving element includes:
    receiving a set of network service responses indicating whether a network service is available to support execution of the task; and
    reserving a network service if the network service's response indicates that the network service is available.

13. The method of claim 12:
    wherein the receiving element includes, receiving a network service response indicating that a network service is no longer available to support execution of the task; and
    wherein the executing element includes, halting execution of the task in response to the network service's unavailability.

14. The method of claim 13 wherein the reserving element further includes:
    securing another network service which can replace the unavailable network service.

15. The method of claim 1 further comprising:
    releasing the set of network service after completion of the task.

16. The method of claim 1 further comprising:
    configuring a set of network resources, hosting the set of network services, for uniform service capability.

17. A computer system for network resource management, comprising:
    means for receiving a request to execute a task;
    means for calculating a virtual set of resources required to execute the task:
    means for generating virtual resource requests from the calculated set of virtual resources;
    means for generating liaison module for each virtual resource request, wherein each liaison module includes means for identifying the network resources needed to provide services for a portion of the task's execution;
    means for reserving a set of network services for each virtual resource; and
    means for executing the task on the reserved services.

18. The system of claim 17, wherein the liaison modules comprise a program liaison module for linking a program service to a corresponding virtual resource request, a processor liaison module for linking a processor service to a corresponding virtual resource request, a memory liaison module for linking a memory service to a corresponding virtual resource request, and an I/O liaison module for linking an I/O service to a corresponding virtual resource.

19. The method of claim 1, wherein the liaison modules comprise program liaison module for linking a program service to a corresponding virtual resource request, a processor liaison module for linking a processor service to a corresponding virtual resource request, a memory liaison module for linking a memory service to a corresponding virtual resource request, and an I/O liaison module for linking an I/O service to a corresponding virtual resource.

* * * * *

UNITED STATES PATENT AND TRADEMARK OFFICE
CERTIFICATE OF CORRECTION

PATENT NO. : 7,043,730 B2
APPLICATION NO. : 10/232783
DATED : May 9, 2006
INVENTOR(S) : Motoo Tanaka It is certified that error appears in the above-identified patent and that said Letters Patent is hereby corrected as shown below:

In column 3, line 46, delete "18" and insert -- 118 --, therefor.

In column 5, line 64, in Claim 5, delete "110" and insert -- I/O --, therefor.

In column 5, line 66, in Claim 5, delete "110" and insert -- I/O --, therefor.

In column 6, line 24, in Claim 11, after "set" insert -- of --.

In column 6, line 54, in Claim 17, delete "task:" and insert -- task; --, therefor.

In column 6, line 57, in Claim 17, after "generating" insert -- a --.

In column 7, line 6, in Claim 19, after "comprise" insert -- a --.

Signed and Sealed this

Eleventh Day of August, 2009

David J. Kappos
*Director of the United States Patent and Trademark Office*